United States Patent
Koneru et al.

(10) Patent No.: US 9,459,994 B2
(45) Date of Patent: Oct. 4, 2016

(54) MOBILE APPLICATION TESTING SYSTEMS AND METHODS

(71) Applicant: Kony, Inc., Orlando, FL (US)

(72) Inventors: Raj K. Koneru, Windermere, FL (US); Pattabhi Rama Rao Dasari, Hyderabad (IN); Prajakt Deshpande, Hyderabad (IN); Jason Evans, Ringgold, GA (US); Rajendra Komandur, Hyderabad (IN); Sriram Ramanathan, Lutz, FL (US); Matthew Terry, Celebration, FL (US); Matthew B. Trevathan, Roswell, GA (US); Sathyanarayana Vennapusala, Hyderabad (IN)

(73) Assignee: KONY, INC., Orlando, FL (US)

( * ) Notice: Subject to any disclaimer, the term of this patent is extended or adjusted under 35 U.S.C. 154(b) by 0 days.

(21) Appl. No.: 14/098,982

(22) Filed: Dec. 6, 2013

(65) Prior Publication Data
US 2014/0237455 A1     Aug. 21, 2014

Related U.S. Application Data

(60) Provisional application No. 61/767,018, filed on Feb. 20, 2013.

(51) Int. Cl.
G06F 11/36 (2006.01)

(52) U.S. Cl.
CPC ....... *G06F 11/3692* (2013.01); *G06F 11/3688* (2013.01)

(58) Field of Classification Search
None
See application file for complete search history.

(56) References Cited

U.S. PATENT DOCUMENTS

| | | |
|---|---|---|
| 7,339,891 B2 | 3/2008 | Binder et al. |
| 7,343,586 B1 | 3/2008 | Hernandez |
| 7,703,075 B2 | 4/2010 | Das et al. |
| 7,773,964 B2 | 8/2010 | Ozaki et al. |
| 7,788,642 B2 | 8/2010 | Sohm et al. |
| 7,925,253 B2 | 4/2011 | Breit et al. |
| 7,925,952 B1 | 4/2011 | Katz et al. |
| 8,019,588 B1 * | 9/2011 | Wohlberg et al. ........... 703/22 |
| 8,141,043 B2 | 3/2012 | Jones et al. |
| 8,271,950 B2 | 9/2012 | Bharadwaj |
| 8,402,446 B2 | 3/2013 | Singh |
| 8,479,164 B2 | 7/2013 | Becker et al. |
| 8,533,682 B2 | 9/2013 | Kakulamarri et al. |

(Continued)

OTHER PUBLICATIONS

"Native Application Instrumentation", Experitest Ltd, http://experitest.com/studio/help2/WebHelp/Native_Application_Instrumentation_.htm, 5 Pages, Accessed Dec. 5, 2013.

(Continued)

*Primary Examiner* — Ryan Coyer
*Assistant Examiner* — Daniel Wei
(74) *Attorney, Agent, or Firm* — Andrew M. Calderon; Roberts Mlotkowski Safrar Cole & Calderon, P.C.

(57) ABSTRACT

Approaches for application testing are provided. An approach includes recording a test case of an application running on a mobile device. The approach also includes generating an expected layout based on object data received from the mobile device during the recording. The approach additionally includes receiving playback object data based on the test case being played back on the mobile device or a different mobile device. The approach further includes comparing the playback object data to the expected layout data.

20 Claims, 14 Drawing Sheets

(56) References Cited

U.S. PATENT DOCUMENTS

| | | | |
|---|---|---|---|
| 8,566,648 B2 | 10/2013 | Schroeder | |
| 8,694,964 B1 | 4/2014 | Picard | |
| 8,701,092 B1* | 4/2014 | Colcord | 717/127 |
| 8,739,126 B2 | 5/2014 | Glaser et al. | |
| 8,782,603 B2 | 7/2014 | Plate | |
| 8,806,446 B2 | 8/2014 | Kilbane | |
| 8,856,748 B1 | 10/2014 | Larsen et al. | |
| 8,881,111 B1 | 11/2014 | Smith et al. | |
| 8,918,762 B2 | 12/2014 | Jensen et al. | |
| 8,930,766 B2 | 1/2015 | Griesinger et al. | |
| 8,978,014 B1 | 3/2015 | Larsen et al. | |
| 2005/0204343 A1* | 9/2005 | Kisamore et al. | 717/124 |
| 2007/0171473 A1* | 7/2007 | Iwasaki | 358/1.18 |
| 2011/0225417 A1* | 9/2011 | Maharajh et al. | 713/150 |
| 2011/0320879 A1* | 12/2011 | Singh et al. | 714/38.1 |
| 2012/0036220 A1* | 2/2012 | Dare et al. | 709/217 |
| 2013/0055083 A1* | 2/2013 | Fino | 715/716 |
| 2013/0179830 A1* | 7/2013 | Lee et al. | 715/784 |

OTHER PUBLICATIONS

Office Action dated Apr. 3, 2015 in U.S. Appl. 14/098,987; 13 pages.

Office Action dated Nov. 26, 2014 in U.S. Appl. No. 14/098,987; 17 pages.

Office Action dated Aug. 27, 2015 for related U.S. Appl. No. 14,098,987, 12 pages.

Notice of Allowance dated Jan. 11, 2016 for U.S. Appl. No. 14,098,987, 14 pages.

Prathibhan et al., "An Automated Testing Framework for Testing Android Mobile Applications in the Cloud", IEEE, pp. 1216-1219, 2014, 4 pages.

Vilkomir et al., "Effectiveness of Multi-device Testing Mobile Applications", IEEE, pp. 44-47, 2015, 4 pages.

Kirubakaran et al., "Mobile Application Testing—Challenges and Solution Approach through Automation", IEEE, pp. 79-84, 2013, 6 pages.

Hai-ru et al., "A Mobile Agent based General Model for Web Testing", IEEE, pp. 158-161, 2009, 4 pages.

* cited by examiner

MOBILE APPLICATION TESTING SYSTEMS AND METHODS

FIELD OF THE INVENTION

The present invention relates generally to mobile applications and, more particularly, to systems and methods of testing mobile applications.

BACKGROUND OF THE INVENTION

Mobile application development is the process by which application software is developed for handheld devices, such as personal digital assistants, enterprise digital assistants, mobile phones (e.g., smartphones), tablet computers, etc. Mobile applications (e.g., "apps") can be pre-installed on devices during manufacturing, downloaded by customers from various mobile software distribution platforms, or delivered as web applications using server-side or client-side processing to provide an application-like experience within a web browser.

It is common for an application developer to test an application before releasing the application to the end user. Testing may be used to find and fix errors in an application so that, once released, the end user has a positive user experience when using the application. Mobile applications may be initially tested within the development environment using emulators and later subjected to field testing. Emulators provide an inexpensive way to test applications on mobile devices to which developers may not have physical access. Many aspects of application testing are performed manually, which leads to the application testing process as a whole being time consuming and expensive.

SUMMARY OF THE INVENTION

In accordance with aspects of the invention, there is a method of application testing that includes recording a test case of an application running on a mobile device. The method also includes generating an expected layout based on object data received from the mobile device during the recording. The method additionally includes receiving playback object data based on the test case being played back on the mobile device or a different mobile device. The method further includes comparing the playback object data to the expected layout data. At least one of the recording, the generating, the receiving, and the comparing are performed by a computing device.

In accordance with additional aspects of the invention, there is a system for testing applications. The system includes a test server including a test control is adapted to: generate an expected layout based on object data received while recording a test case of an application; receive playback object data during playback of the test case on a mobile device equipped with the application; and compare the playback object data to the expected layout.

In accordance with further aspects of the invention, there is a computer system for testing an application, the system including a CPU, a computer readable memory, and a computer readable storage media. The system includes program instructions to program instructions to communicate with an agent loaded on a mobile device to remotely control running a test case of the application on the mobile device. The system includes program instructions to program instructions to receive, from the agent loaded on the mobile device, a screen shot and playback object data associated with a view of the application during the test case, wherein the playback object includes at least one of object location and object size. The system includes program instructions to program instructions to compare the playback object data to an expected layout, and to compare the screen shot to an expected screen shot. The program instructions are stored on the computer readable storage media for execution by the CPU via the computer readable memory. The receiving and the comparing are performed at a test server that is separate from the mobile device

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
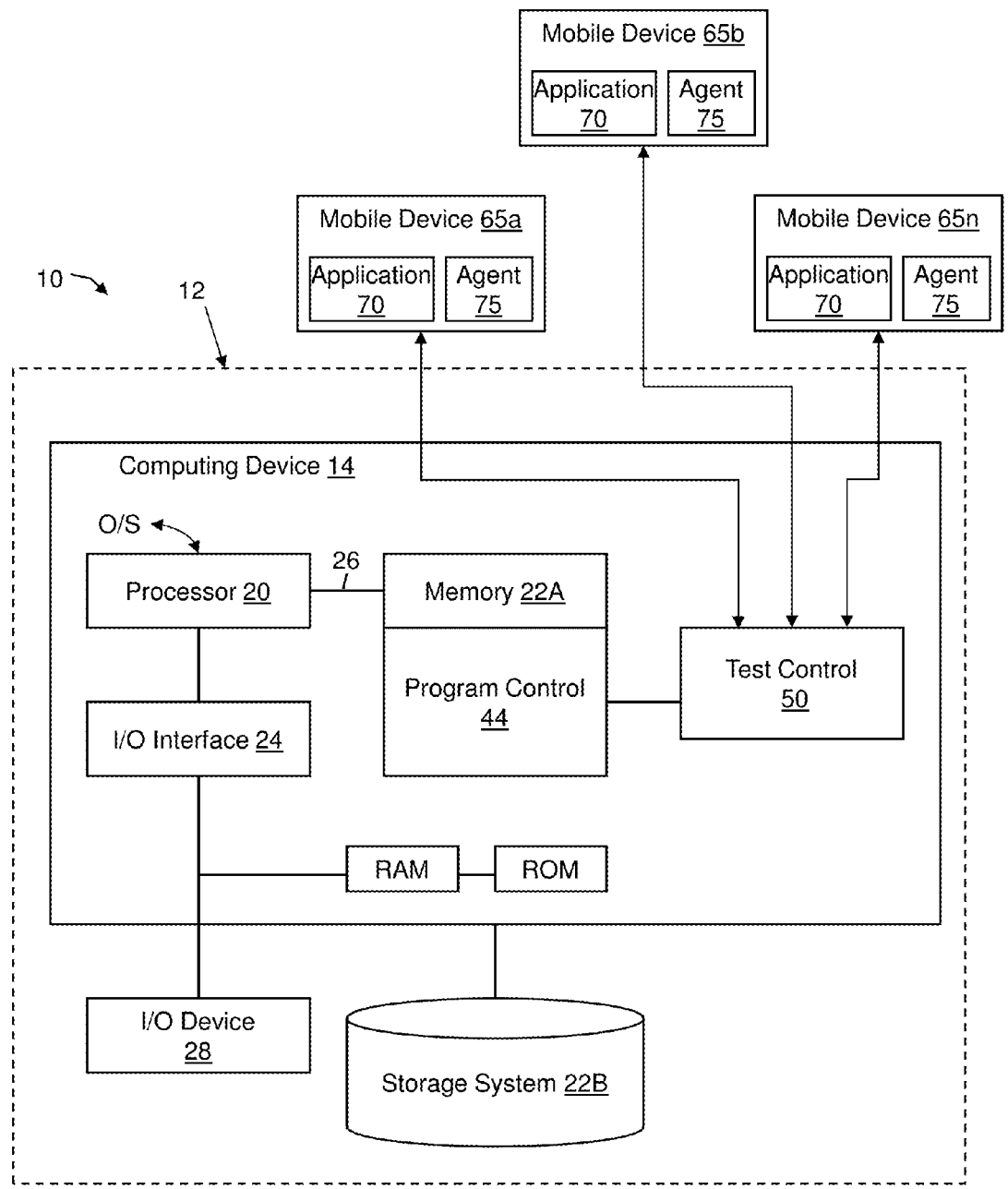
FIG. 1 shows an illustrative environment for managing the processes in accordance with the invention.

The present invention relates generally to mobile applications and, more particularly, to systems and methods of testing mobile applications. More particularly, the invention facilitates testing an application running on a mobile device by leveraging the use of an agent installed on the mobile device or the use of a javascript library for web based applications. In embodiments, the agent or script (referred to herein simply as the agent) provides a mechanism for reporting, to a test server, data defining an actual layout of objects presented by the application on the mobile device. The test server may be used to compare the actual layout to a stored (e.g., intended) layout for testing the application. The layout may include repeating objects that extend beyond the display area of the mobile device. In this manner, implementations of the invention may be used to facilitate user experience testing based on layouts instead of, or in addition to, pixel-based comparisons.

A pixel-based way of performing user experience testing involves taking a screen shot of a baseline of the screen and comparing future results (e.g., a screen shot of a device during a test run) against the baseline screen shot. Pixel-based test engines are not suited for comparing user experiences that leave the page (e.g., objects that extend beyond the display area of the mobile device) or that have a dynamic area that repeats since the focus is on pixel comparison of the display area. Accordingly, in pixel-based comparisons, small changes to the user experience can require recreating the tests, which is time consuming. Additionally, the focus is on pixel comparison even though layout is usually the first problem, especially for repeating areas.

In contrast to pixel-based systems, implementations of the invention focus on the ability to test the layout of a mobile user interface (UI) instead of testing the UI only from a pixel perspective. In embodiments, the agent at the mobile device reports the properties of each layout and the objects in the layout to a test server. Instead of focusing on the pixels an object consumes on the screen, the test server stores the layout (object location, height, width, etc.), which facilitates comparing test run layouts to intended layouts, e.g., for error detection.

In accordance with aspects of the invention, the agent resides on the mobile device and acts as a reporter for the application that is running on the mobile device. In embodiments, the agent reports information associated with the application to a test server which may be part of a test management system. The information may include, for example, but is not limited to: application performance, memory usage, visual layout, called methods, inputs and outputs from the screen, and any variables the developer marks for introspection (e.g., monitoring). In embodiments, the server receives object data from the agent and generates a layout based on the object data (e.g., when recording a test case) or compares the object data to a stored layout (e.g., when playing back a test case).

Layout-based UX testing in accordance with aspects of the invention focuses on the layout of the page and ensuring the layout meets a design specification, whereas pixel-based testing focuses on the exact location of an image or object on the screen. Additionally, layout-based UX testing in accordance with aspects of the invention tests layout components that are off the screen, whereas pixel-based testing is limited to what is seen on the screen. Further, layout-based UX testing in accordance with aspects of the invention focuses on the layout which allows the tester to determine repeating widgets within the layout, ensures integration quality of testing data, and promotes testing early and often. Pixel-based testing, on the other hand, cannot test objects that are not on the screen, uses image recognition to determine GUI objects, and often requires reproducing a master image for comparison.

Aspects of the invention may include combining layout-based testing and pixel-based testing. For example, implementations of the invention may: compare playback layouts to previous layouts to ensure the screen is properly formatted; accommodate dynamic areas using layout testing; ensure properties such as word wrap are enabled; combine edge detection with text pixel detection to find text overruns without need for storing golden images; and perform conventional pixel testing as an added layer of comparison.

It should be understood that browser based testing can have multiple challenges in a mobile and desktop environment since there is a wide range of browsers to support. For example, code introspection and remote controlling of multiple browsers is a difficult task with ongoing maintenance concerns, as well as noted differences in which browsers can report an object that is in the same location. For example, where pixel comparison may show the pages are equal, layout comparison may show a multipixel difference in location, height or width. Also, there is an inherent complexity of taking screenshots on each platform. Although the functions may, overall stay the same, there may be presentation nuances that are presented when tests are run across channels. In view of these and other issues, the present invention provides a testing system which provides many advantages over current manual processes, as described herein.

Application Testing

Implementations of the invention may be directed to automating aspects of application testing. By implementing the automated aspects of the present invention, testing throughout the software lifecycle is greatly improved. In addition, it is now possible to improve visibility into backlog through defect tracking system integration, as well as reduce the number of testers needed to perform testing and reduce errors introduced by manual testing. It is also now possible to automate repeatable processes for consistency allowing testers to use test cases as building blocks for larger test scenarios, provide deep coverage in all areas of the application under test, and produce automated reports based on testing processes.

According to aspects of the invention, a multichannel automated testing solution focuses on one or more of the following building blocks of testing: unit testing, functional testing, data testing, and user experience testing. These different testing techniques in accordance with aspects of the present invention are described below, in detail.

Unit Testing

Unit testing provides developers with a mechanism for testing a unit of code of an application to detect problems before the application is passed to the tester. In embodiments, unit testing tests individual functions in isolation with the ability to set preconditions and post conditions. Unit testing also allows grouping smaller tests into larger scenarios. Unit testing also includes tolerance testing, regular expression and range function testing. According to aspects of the invention, application developers can unit test locally and store the unit test within a test server. In embodiments, aspects of unit testing may be automated by integrating unit testing into the application build process (e.g., build management system) with application programming interfaces (API's) that can be called from software.

Functional Testing

Functional testing provides testers with the ability to validate expected navigation and behaviors of the application. In embodiments, functional testing monitors the behavior of the application to ensure the application displays the correct outputs, navigates correctly, and correctly responds to swipes, taps, inputs and other gestures, for example. In this manner, functional testing tests the inputs and outputs of the application from the 'glass' or screen perspective of the mobile device on which the application is run.

Data Testing

Data testing ensures that the information used for testing is correct. In embodiments, data testing includes testing of services and data throughout the application lifecycle. Initial data testing provides a mechanism for ensuring data quality with back end systems. Other aspects of data testing, called introspection, focus on what methods are called by the application being tested, what data is passed between methods, and the order in which these methods are called. In this manner, data testing ensures that data from external services is correct and gives developers insight into key data points within their application in relation to the testing steps and processes.

User Experience Testing

User experience (UX) testing in aspects of the invention provides a mechanism for testing the overall user experience through the use of layout validation in conjunction with pixel comparison. In embodiments, UX testing ensures that objects display correctly on the mobile device screen, including ensuring that text boxes, labels, and other user interface components are properly displayed in a correct format. In this manner, implementations of the invention create a robust, automated testing mechanism that can compare dynamic, repeating content as well as understand specific areas of both layout and pixel comparison.

For example, UX testing compares objects on the view and their properties, such as height, width, location on the page and other widget level properties, and can create repeating patterns that recognize when visual objects repeat on the page so the testing automation system can test complex, repeating user interfaces. The UX testing can also test static areas of a view using pixel comparison, which allows a tester to select a specific area for image comparison or detect text overruns as examples.

Exemplary Application Testing

An exemplary application testing scenario in accordance with aspects of the invention is as follows. First, a developer creates an application, sets the application to test mode, and publishes the application to a testing application store. Next, a tester (e.g., one or more users in a test team) downloads the application from the testing application store to one or more mobile devices. In embodiments, the tester records one or more new test cases by, for example: logging onto a test workbench (e.g., a software interface of a test server adapted for, among other things, software-based control of test applications installed on mobile devices); opening a recording dialog; selecting the mobile device with the application installed; beginning recording the new script; and manipulating the application using the device (e.g., gestures such as finger taps, swipes, button inputs, etc.) while the test system is recording. At each page (e.g., different screen) of the application on the mobile device, the test server saves a screenshot of the view on the mobile device, saves any objects on the page and their layout properties, and saves any inputs to and outputs from methods of the application.

Still referring to the exemplary application testing scenario in accordance with aspects of the invention, the tester may edit the recorded test case prior to performing functional and/or UX testing. For example, the tester may open the recorded test case using a test workbench, look at each view that was produced in the test case, and mark objects from one or more views for validation. The test workbench may be programmed with default values for some validation fields. In other validation fields, the tester may define or import one or more values, e.g., values such as username and password, which may change with each test run. For example, the tester may import a spreadsheet from another device, and assign columns in the spreadsheet to a field of the test case for dynamic validation. The tester may also change the timeout of one or more back end calls, e.g., to account for back end server performance. The tester may also change the time-to-think that was recorded by the test server when the test case was recorded, e.g., to make the test run faster between screens and/or applications selections that do not require back end service calls. The tester may save the edited test case at the test server for later running tests of the application on one or more mobile devices.

With continued reference to the exemplary application testing scenario in accordance with aspects of the invention, the tester may perform functional testing and/or UX testing using the saved test case including automated scripts. In embodiments, functional testing and UX testing may each include, for example: selecting a saved test case from a testing menu of the test workbench; using the test workbench to select a device on which to run the test; running the test on the mobile device from the test server; recording the results of the test at the test server; and checking the results of the test. Functional testing may specifically include the test server recording at each step of the test for each mobile device: a screen shot of the application at the mobile device; any functions called by the application including the order in which the functions were called; and any variables the tester set for watches in the application code. UX testing may specifically include the test server: receiving layout information from the mobile device running the application; comparing the received layout information to layout information that was stored when recording the test case; and marking as possible defects those fields that do not match.

System Environment

The present invention may be embodied as a system, method or computer program product. The present invention may take the form of a hardware embodiment, a software embodiment or a combination of software and hardware. Furthermore, the present invention may take the form of a computer program product embodied in a computer readable storage medium of expression having computer-usable program code embodied in the medium. The computer-usable or computer-readable medium may be any medium, apparatus, or device that can contain, store and communicate the program for use by or in connection with an instruction execution system, apparatus, or device. The computer readable storage medium may be, for example, an electronic, magnetic, optical, electromagnetic, infrared, or semiconductor system, apparatus, or device.

FIG. 1 shows an illustrative environment 10 for managing the processes in accordance with the invention. The environment 10 includes a server 12 or other computing system. The server 12 can be a test server that is part of a test management system used for testing applications on mobile devices. In embodiments, the server 12 can be a standalone server, which implements the processes of the present invention within a networking environment. That is, the server 12 and/or processes performed by the server 12 can be integrated into the networking environment of any enterprise.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, computing device 14 includes a random access memory (RAM), a read-only memory (ROM), and an operating system (O/S). The computing device 14 is in communication with external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65a-n, etc.) using any type of communications link. The storage system 22B can store data such as one or more databases which can be maintained, for example, by an enterprise administrator.

The processor 20 executes computer program code (e.g., program control 44), which can be stored in memory 22A and/or storage system 22B. In embodiments, the program control 44 controls a test control 50 which comprises an application that is adapted to perform one or more of the processes described herein. The test control 50 can be implemented as one or more program code in program control 44 stored in memory 22A as separate or combined modules. Additionally, test control 50 may be implemented as separate dedicated processors or a single or several processors to provide the functions described herein. While executing the computer program code, processor 20 can read and/or write data to/from memory 22A, storage system 22B, and/or I/O interface 24. In this manner, the program code executes the processes of the invention.

According to aspects of the invention, test control 50 communicates with one or more mobile devices 65a, 65b, . . . , 65n, each of which has a copy of an application 70 to be tested. As used herein, a mobile device refers to a smartphone, tablet computer, personal digital assistant, or similar device that includes a mobile operating system, wireless communication antenna, processor, user interface, memory, etc. In embodiments, an agent 75 resides on each mobile device 65a-n and reports information about application 70 to test control 50 when application 70 is running. More specifically, in embodiments, agent 75 is configured to "remote control" the mobile device, and by adding an agent to the device it is now possible to capture performance data of the device, e.g., application, and send this application information to the computing device, e.g., test control 50. In embodiments, test control 50 and more specifically computing device 14 may be implemented as or on a testing integrated development environment (IDE). In this way, agent 75 can be added to an application 70 that sends native object information to the testing IDE including the dimensions and location of objects, the native ID, the class, and the text associated with the object, amongst other functionality and features.

In aspects of the invention, test control 50 may use agent 75 to remotely control the mobile devices 65a-n for testing purposes. The agent 75 may be one or more scripts or other suitable programming and may be added to application 70 when the application code is compiled. While application 70 is running on one of mobile devices 65a-n, agent 75 sends native object information to test control 50, such as for example: an identification of methods called by application 50; data inputs and data outputs associated with each called method; user inputs (e.g., taps, clicks, swipes, etc.); performance data from the device; dimensions and locations of objects on the mobile device screen; and the native ID, the class, and the text associated with each object, amongst other features and combinations thereof.

The program code can include computer program instructions which are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium may be, for example an electronic, magnetic, optical, electromagnetic, infrared, and/or semiconductor system. More specific examples (a non-exhaustive list) would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Figure 2:
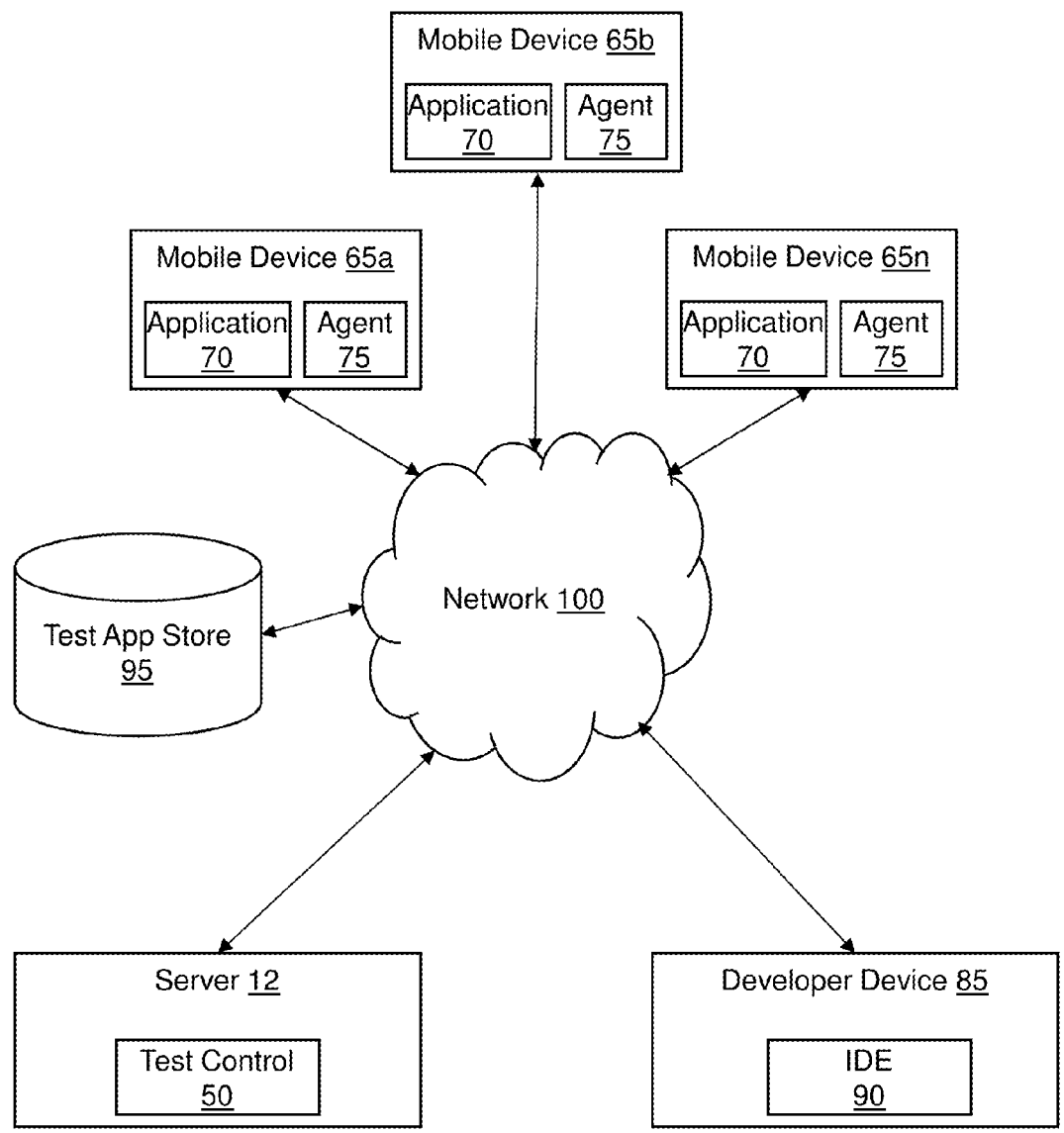
FIG. 2 shows a block diagram of an exemplary system in accordance with aspects of the invention.

FIG. 2 shows a block diagram of an exemplary system in accordance with aspects of the invention. In embodiments, the system includes server 12 (e.g., test server) that runs test control 50. The system may also include a developer computer device 85 comprising a developer IDE (integrated development environment) 90 which the developer uses to create an application. In embodiments, the developer instruments the application code for testing by configuring certain properties of the application using developer IDE 90, as discussed in greater detail below with respect to FIGS. 3 and 4. In aspects of the invention, when the application code is instrumented for testing, developer IDE 90 compiles the application code with the agent (e.g., agent library) that is adapted for communicating with test control 50 of the test management system (TMS). The developer computer device 85 submits the compiled application to a test app store 95. One or more mobile devices 65a-n may download application 70 including agent 75 from test app store 95. The server 12 including test control 50 may then communicate with agent 75 on devices 65a-n to control testing of application 70 on the devices 65a-n.

Still referring to FIG. 2, the various devices of the system may communicate via a network 100, which may be one or more conventional communication network types including, but not limited to: Internet, local area network (LAN), WiFi, etc. In one exemplary non-limiting environment, test app store 95 is a storage node in a cloud environment, and server 12 communicates with devices 65a-n locally, e.g., through LAN or WiFi.

Figure 3:
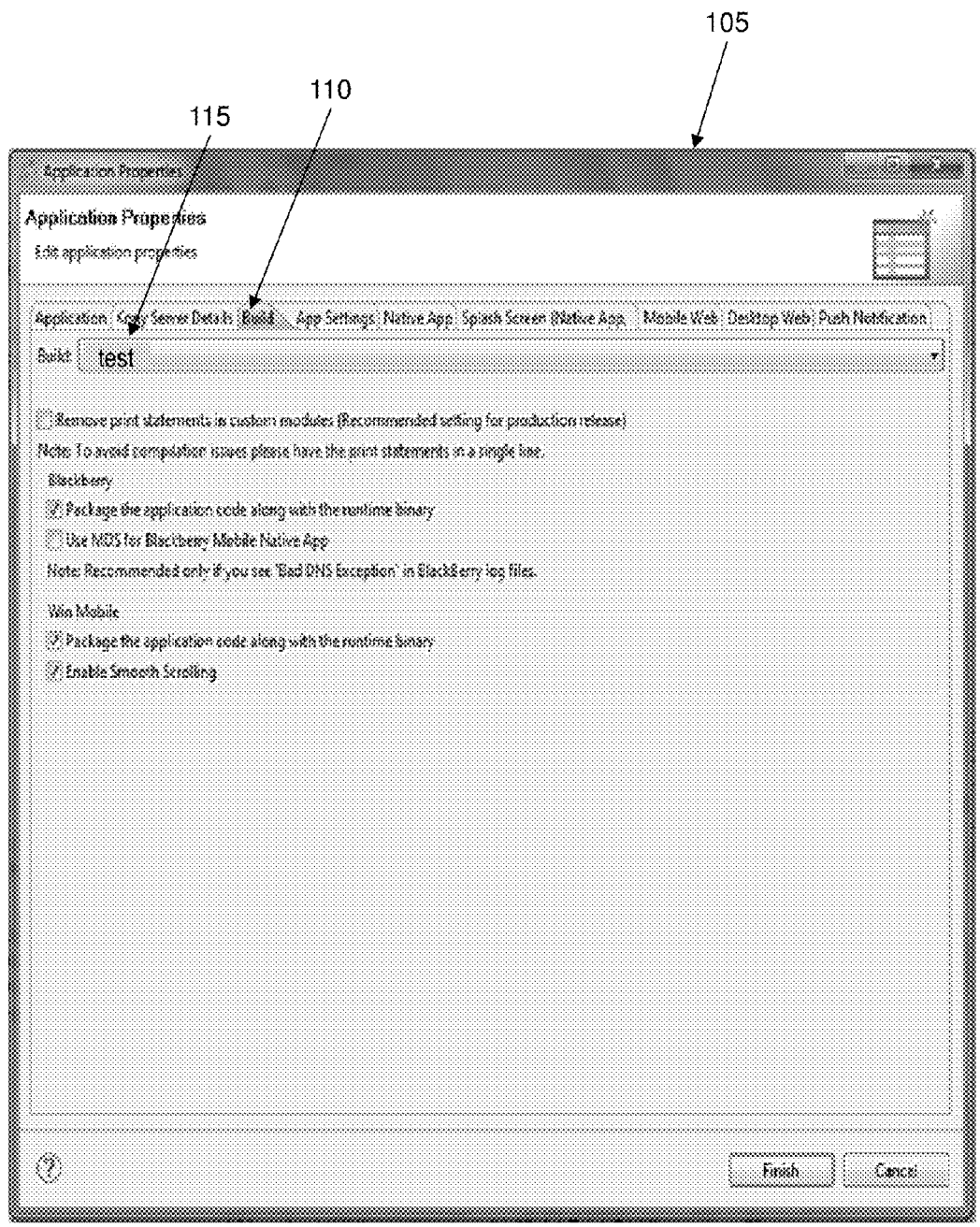
FIGS. 3-5, 6A, and 6B illustrate exemplary user interfaces and associated functionality in accordance with aspects of the invention.
Figure 4:
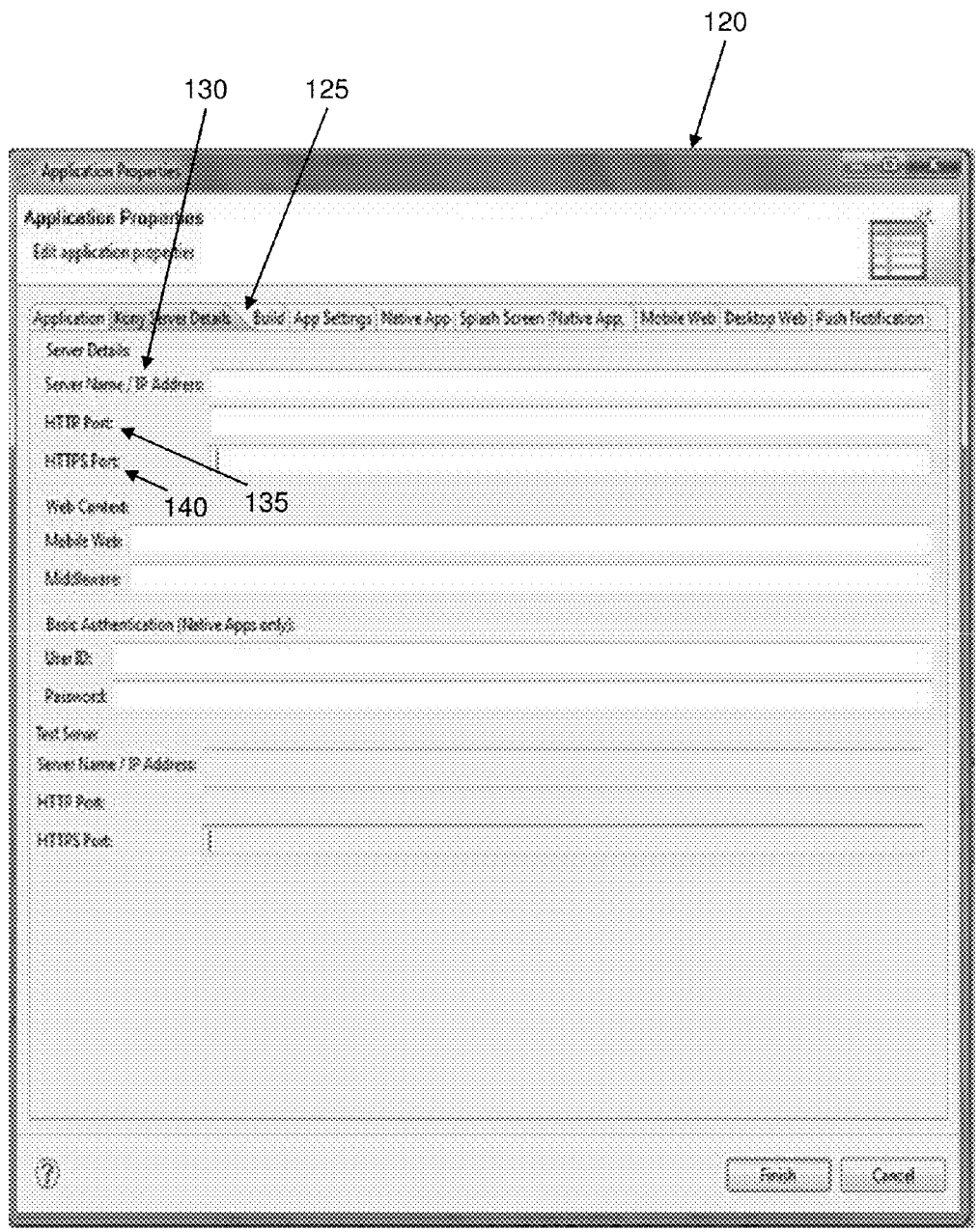

FIGS. 3 and 4 illustrate exemplary user interfaces and associated functionality of a developer IDE (e.g., developer IDE 90 of FIG. 2) in accordance with aspects of the invention. FIG. 3 shows an interface 105 in which a developer may instrument the application code for testing by selecting a test mode within the application properties. For example, under a "Build" tab 110 of the IDE there may be a menu 115 that permits the developer to select a build type such as, for example: release, debug, test, or test+debug. To instrument the application for testing, the developer selects test or test+debug. In embodiments, selecting the test or test+debug build type causes the IDE to inject the agent in the application when the application is compiled.

FIG. 4 shows an interface 120 in which a developer may instrument the application code for testing by defining a test server (e.g., server 12 with test control 50) within the application properties. For example, under "Server" tab 125 of the IDE there are fields that permit the developer to enter information regarding a server, such as: Server Name/IP Address 130, HTTP Port 135, HTTPS Port 140. In embodiments, the identity of the testing sever defined in interface 120 is injected in the compiled application as part of the agent library, e.g., to instruct the mobile device where to send test data when running the application.

Figure 5:
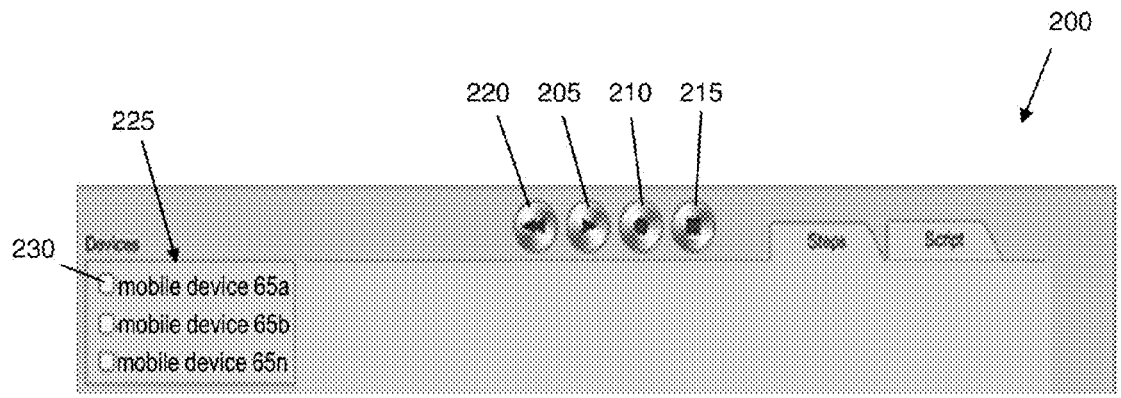

FIG. 5 illustrates an exemplary user interface (UI) 200 and functionality of a test workbench associated with a test control (e.g., test control 50) in accordance with aspects of the invention. In embodiments, the workspace provides features including recording, playback and other controls, object library, test steps and device selector.

More specifically, in aspects of the invention, UI 200 includes a play button 205, record button 210, stop button 215, and rewind button 220 that control the recording and playback of a test case. In embodiments, the UI 200 may also display a list 225 of mobile devices that are currently connected to the test server (e.g., server 12) via the test agent in the particular application. In aspects of the invention, the list 225 is automatically populated by the test server, which scans for devices on which the application and agent are installed (e.g., via communication between the agent and the test server). Each mobile device in the list 225 may be associated with a selection field 230 that permits a user to select the particular mobile device for either recording or running the test case. In this manner, a test case may be recorded from a first mobile device and run on a second, different mobile device. In aspects of the invention, the application and the test case are programmed with logic that permits use on different native platforms (e.g., different mobile operating systems and devices), such that a test case may be recorded from a first device having a first operating system and then run on a second device having a second operating system different than the first operating system.

Figure 6A:
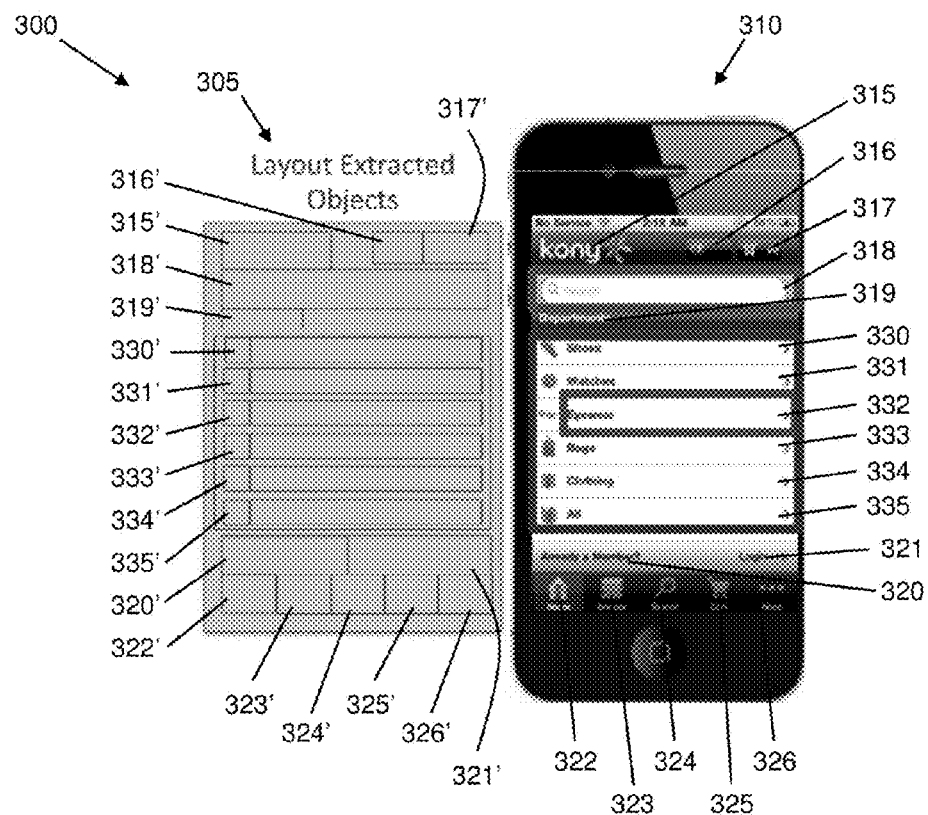

FIG. 6A illustrates an exemplary user interface (UI) 300 and functionality of a layout editor associated with a test control (e.g., test control 50) in accordance with aspects of the invention. The UI 300 may be part of UI 200, or may be separate from UI 200. In embodiments, when the system is recording a test case (e.g., after selecting a device using list 225 and selecting (e.g., pressing) record button 210 of UI 200), the agent at the mobile device transmits data to the test server. During recording of a test case, the application is run on the mobile device and events (e.g., finger taps, button presses, etc.) are recorded as steps to provide a workflow of the task for the test case. In embodiments, during recording, the agent sends to the test server a list of all objects associated with a view of a step of the test case, and the properties of each object including, but not limited to: object height; object width; object location; word wrap; font; font size; password; border; padding; and margin. In embodiments, the object data sent by the agent to the test server includes programmer-defined attributes regarding the objects, such as whether an object is defined in the code as a repeating object or a non-repeating object. In further embodiments, the agent also sends to the test server a screen shot of the display on the device that corresponds to the above-noted object data of each step.

In aspects of the invention, the test server (e.g., test control 50) is configured to use the object data received from the agent to create and display (e.g., in UI 300) a layout 305 of the view and a screen shot 310 corresponding to the layout 305. More specifically, screen shot 310 is a copy of what is displayed on the mobile device in a single step of the application when recording the test, and layout 305 shows a representation of the objects included in the screen shot 310. For example, screen shot 310 includes objects 315-326 and 330-335, and layout 305 includes corresponding objects 315'-326' and 330'-335'. In embodiments, the location, size, spacing, etc. of the objects 315'-326' and 330'-335' in layout 305 is determined based on object data received from the agent (e.g., object height; object width; object location; word wrap; font; font size; password; border; padding; margin; etc.). In this manner, the test server (e.g., test control 50) is adapted to create layout 305 based on data received from the agent.

The screen shot 310 in FIG. 6A is useful for conventional pixel-based comparisons of this application running on the mobile device. However, the screen shot 310 does not provide information about repeating objects that are associated with this view that are off the screen, e.g., not currently shown on the mobile device but accessible by scrolling the display on the mobile device.

Figure 6B:
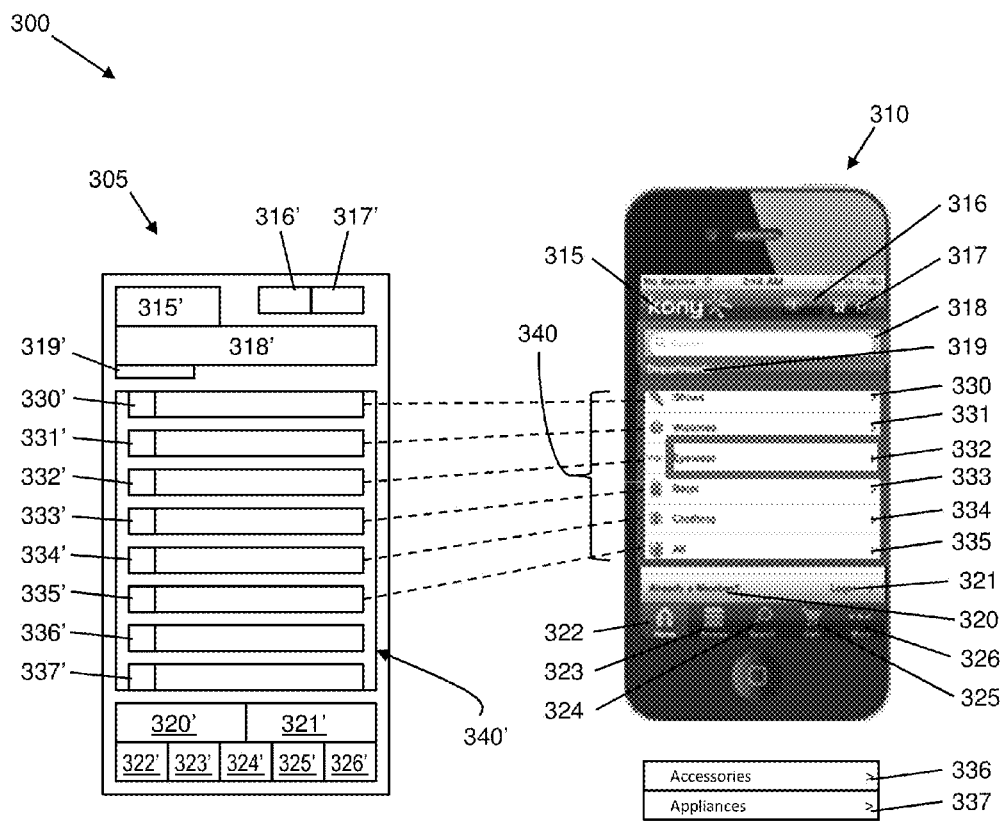

FIG. 6B depicts how layout 305 may be configured to display the layout of additional objects associated with the view of screen shot 310 but which additional objects are not included in screen shot 310 because they are off the screen of the mobile device. For example, although screen shot 310 only shows objects 330-335 in a repeating area 340, there may be additional objects that are off the screen that would be displayed on the screen in the event the user scrolled the display of the repeating area on the mobile device. More specifically, objects 315-319 and objects 320-326 may be static on the screen of the mobile device, while objects 330-335 within repeating area 340 are scrollable. When a user scrolls objects 330-335, e.g., using a gesture such as a finger swipe or the like, the static objects 315-319 and 320-326 remain stationary on the screen while the scrollable objects 330-335 move according to the gesture.

In the example shown in FIG. 6B, there are two additional objects 336 and 337 that are not shown in screen shot 310 but nonetheless are presentable in the view of the application. These additional objects 336 and 337 are depicted outside of screen shot 310 to represent that they are associated with the view of screen shot 310 but not actually shown in the screen shot 310. If a user were to employ a gesture at the mobile device to scroll the objects 330-337, the screen display of the mobile device would change from showing objects 330-335 to showing objects 331-336 or objects 332-337, while static objects 315-319 and 320-326 remain stationary on the screen, as is understood by those of skill in the art.

With continued reference to FIG. 6B, and in accordance with aspects of the invention, the agent at the mobile device sends information to the test server about all of the objects associated with the view, including objects that are off the screen but that are accessible by scrolling. In this manner, the layout 305 at the UI 300 of the test workbench may be configured to show all of the objects 330'-337' of a repeating area 340' (e.g., of repeating area 340 of the mobile device), not just those that are shown in the screen shot 310. This permits implementations of the invention to be used in comparing a layout of objects, rather than just pixel-based comparison of individual screen shots. The flexibility provided by comparing layouts instead of pixels permits a tester to change an aspect of the test, e.g., change a number of objects in a repeating area, without having to re-create the entire test. The flexibility provided by comparing layouts instead of pixels further permits recording a test on one platform (e.g., a first operating system running a first type of mobile device) and running the recorded test on different platforms (e.g., other operating systems running on other types of devices).

In aspects of the invention, the test server (e.g., running test control 50) may be configured to automatically determine whether each object in layout 305 is in a repeating area or a non-repeating area of the display on the mobile device. For example, the application may be coded to provide each object with an attribute (e.g., non-repeating, vertical repeating, horizontal repeating, etc.), and these attributes may be passed from the agent to the test server during recording of the test. Additionally or alternatively, the test control may detect repeating objects using pattern recognition techniques based on the object data received from the agent (e.g., object location, size, shape, proximity, etc.). In embodiments, the test server marks objects as being in a repeating area based on such automatic determination.

In embodiments, the test control may also be configured to permit a user to manually designate any object in the layout 305 as repeating or non-repeating, e.g., by selecting an object in the layout 305 in the UI 300 and marking the object as desired, e.g., from a programmed menu function. For example, a tester can mark a set of objects as repeating by viewing the test objects recorded in a layout editor (e.g., UI 300) that highlights the layout objects for the view. The tester highlights the area that repeats and the test server asks the tester whether the highlighted area repeats horizontally or vertically. In this manner, a tester may manually mark a repeating area 340'.

In embodiments, the test control may also be configured to permit a user to manually change the layout of objects in a recorded test case. For instance, a repeating area may contain two objects when the test case is recorded. A tester may use a layout editor (e.g., UI 300) to change the test data to return three objects in the repeating area. In embodiments, the test server adjusts the layout by changing the location of objects that follow (e.g., below) the repeating area to compensate for the additional object.

In embodiments, after a test case is recorded and saved using the test workbench (e.g., using UI 200 and/or UI 300), the test case may be run against an application on a mobile device. When a tester runs a test case (e.g., by selecting a device from list 225 and hitting the play button 205), the test control (e.g., test control 50) sends execution commands to the application (e.g., application 70) via the agent (e.g., agent 75) at the mobile device (e.g., mobile device 65*a*). The execution commands cause the application to step through the test case, in which case the test server (e.g., server 12) is remotely controlling the application during testing.

In embodiments, while the application is stepping through the test case, the agent (e.g., agent 75) at the mobile device acts as a reporter for the application by communicating back to the test control information such as: application performance, memory usage, visual layout, methods being called, and inputs and outputs from the screen of the mobile device in conjunction with any variables included in the test case, amongst other test control information.

More specifically, in aspects of the invention, the agent sends to the test server object information that is generated by the application running the test case. The test server then compares the object information from the playback to the stored layout to mark possible errors in the application. For objects that are marked as repeating in the stored layout (e.g., manually marked by the tester and/or automatically marked by the test server as being in a repeating area as described above), the test server compares the corresponding objects in the playback to determine whether these objects all have the correct size and/or location. For example, in non-limiting implementations such as the illustrative example of FIG. 6B, the test server determines whether the playback objects 330'-337' in the repeating area 340' all have the same size (e.g., length and width) and the same location (e.g., vertical or horizontal alignment on the screen). In this example, when playback objects in the repeating area do not have the same size and location, the test server automatically indicates a possible layout error for a tester to further examine. The invention is not limited to comparing object size and location in error detection during playback, and any object attributes can be used, such as but not limited to: font style; font size; word wrap (on or off)

In further aspects of the invention, error detection in the playback includes examining which objects immediately follow a repeating area on the screen. For example, in the illustrative case shown in FIG. 6B, static objects 320' and 321' follow (e.g., are immediately adjacent to) the end of the repeating area 340' of repeating objects 330'-337' in the layout in the stored test case. A tester may change the test case to add more objects to the repeating area 340' or remove objects from the repeating area 340'. In this example, during playback, the test server determines whether static objects 320' and 321' immediately follow the last object of the repeating area 340' on the screen. In the event static objects 320' and 321' do not follow the last object of the repeating area in the playback, the test server indicates a possible layout error for a tester to review for possible correction. In some cases, the last object of the repeating area is not visible on the screen (e.g., as in FIG. 6B); however, aspects of the invention accommodate this situation by showing all objects in the repeating area 340' in the layout 305. In this manner, implementations of the invention provide for automatic error detection in the layout of applications during playback.

In embodiments, during playback, the test server (e.g., running test control 50) determines patterns of objects based on their location, width, and height. The test server can be programmed to determine when a repeating area ends back looking for the start of a non-repeating area following the repeating area. When a repeating object is not detected, the test server looks for the adjusted area below it to ensure the area has stopped repeating. If the area below the repeating section does not match the adjusted area, then it can mark it as a possible error.

In the case of two separate repeating areas that occur sequentially, the test control is configured to look for the first repeating area and, if it does not exist (e.g., 0 rows of returned objects), the test control then looks for the second repeating area. Still referring to the case of two separate repeating areas that occur sequentially, in the event the second row returns zero, the test server considers a layout that returns data from the first repetition and the adjusted area as valid. Still further, there may be occurrences when no rows are returned from an area. In this case, the anchor area and the adjusted area would still be present, with no repeats in between.

Accordingly, implementations of the invention as described herein provide the ability to: detect repeating areas using coded attributes that indicate a repeating area; detect sub-areas of a repeating area using code attributes; determine the layout pattern of objects within a repeating section based on the properties of the repeating section (e.g., height, width, relative position, etc.); manually mark an area as repeating; manually mark sub-objects in a repeating section as repeating the layout type; manually mark an area as anchored (e.g., the area does not move when the rest of the screen does); determine objects are anchored based on attributes of the object; store the location of objects within a repository in conjunction with the properties of the object (e.g., height, word wrap and width, etc.); and/or determine if objects off the screen are laid out properly.

Flow Diagrams

FIGS. 7-13 show flow diagrams (e.g., sequence diagrams or swim lane diagrams) implementing aspects of the present invention. The flow diagrams may equally represent a high-level block diagram or a swim-lane diagram of the invention. The steps of the flow diagrams may be implemented and executed, for example, from either a server, in a client-server relationship, or they may run on a user workstation with operative information conveyed to the user workstation. Furthermore, steps of the processes of the invention may be implemented using a computer-readable storage medium having program code for use by or in connection with a computer or any instruction execution system. The software and/or computer program product can be implemented in the environments of FIGS. 1-6B. For example, as depicted in FIGS. 7-13, "Device" may refer to one of mobile devices 65*a-n*, "Application" may refer to application 70, and "Test Management System" may refer to server 12 running the test control 50 as described with respect to FIGS. 1-6B.

Figure 7:
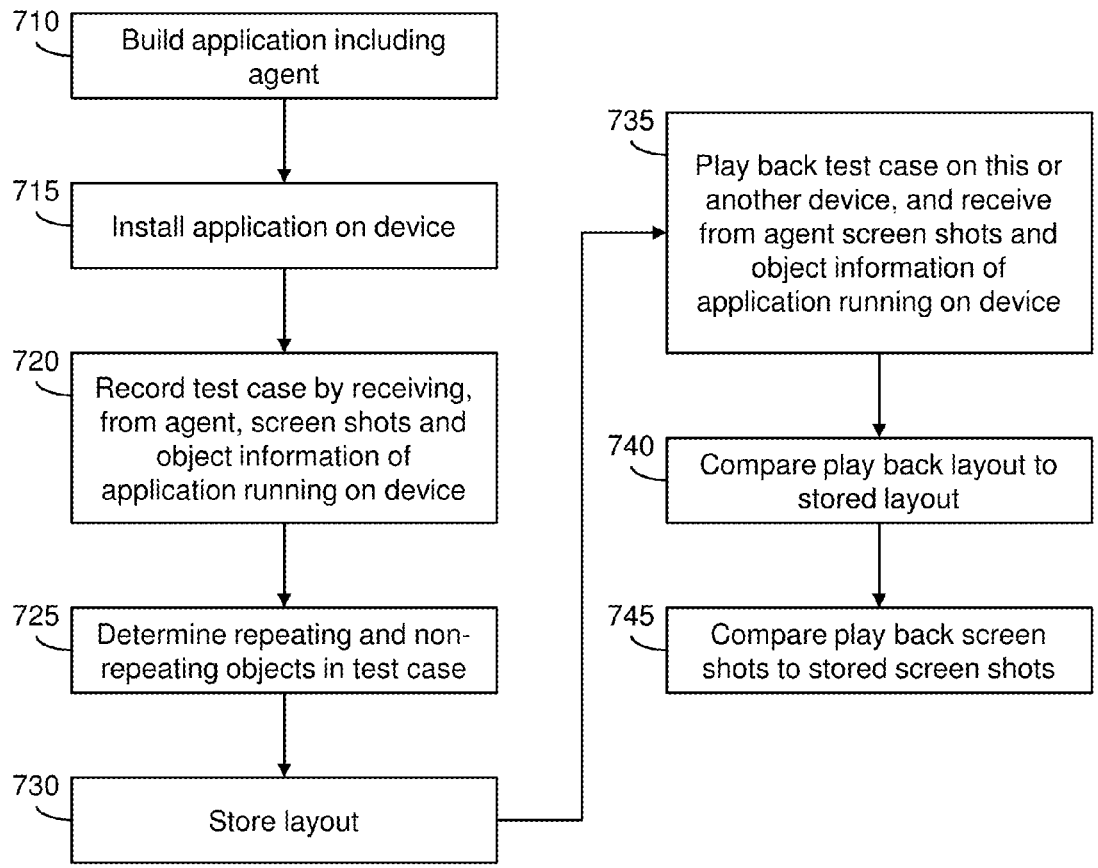
FIGS. 7-13 show flow diagrams of methods in accordance with aspects of the invention.

FIG. 7 shows a user experience testing process in accordance with aspects of the invention. At step 710, a developer builds an application that includes an agent as described herein. This may be performed, for example, by a developer using a developer IDE (e.g., IDE 90) and configuring the application with an agent as described with respect to FIGS.

2-4. Step 710 may include compiling the application and publishing the application to a testing app store (e.g., app store 95).

At step 715, the application from step 710 is installed on a device. This may be performed, for example, by downloading the application from the testing app store to a mobile device (e.g., device 65*a*).

At step 720, a test case is recorded using the application and device of step 715. In embodiments, a tester uses a test workbench (e.g., UI 200 of test server 12) to select the mobile device and the application, and selects (e.g., presses) a record button to begin recording the test case (e.g., as described with respect to FIG. 5). While recording the test case, the test server (e.g., running test control 50) receives, from the agent at the device, object data and screen shots of the application as the application is running on the device. As described with respect to FIG. 6A, the object data may include, but is not limited to: object height; object width; object location; word wrap; font; font size; password; border; padding; and margin. Step 720 may include the test server automatically generating an expected layout (e.g., layout 305) based on object data received from the mobile device during the recording, e.g., in a manner similar to that described with respect to FIGS. 6A and 6B.

At step 725, repeating and non-repeating areas of the layout are determined. As described with respect to FIGS. 6A and 6B, the repeating and non-repeating areas may be determined automatically by the test server and/or manually by the tester. For example, the test server may automatically determine repeating and non-repeating areas based on built-in attributes of the objects (e.g., received with the object data) and/or using pattern recognition. The tester may mark areas as repeating or non-repeating using a layout editor (e.g., UI 300). At step 730, the test server stores the recorded test case including the layout(s) with an area marked as repeating or non-repeating, e.g., at a test case repository (e.g., at storage system 22B).

At step 735, the recorded test case from step 730 is played back on a test device for testing the application. In embodiments, a tester uses UI 200 to select a test device on which the application (e.g. from step 710) is installed. The test device may be the same device from step 715 or a different device (e.g., as indicated at list 225 of UI 200). The tester also uses the test server to retrieve the recorded test case, e.g., from a test case repository. In aspects of the invention, the test server sends instructions to the agent at the test device to remotely control playback of the application on the test device according to the recorded test case. During playback, the agent sends to the test server object data and screen shots of the application running on the test device. Step 735 may thus include the test server receiving playback object data from an agent on a test device based on the test case being played back on the test device.

At step 740, the test server compares the playback object data (e.g., received at step 735) to the layout(s) of the stored test case (e.g., the expected layout data) for detecting errors in the layout(s) of the playback. In embodiments, based on the repeating areas defined at step 725, the test server performs error detection by comparing the size and location of playback objects within the repeating areas (e.g., as described above with respect to FIG. 6B). In additional embodiments, the test server performs error detection by analyzing the static objects that follow repeating areas (e.g., as described above with respect to FIG. 6B). Step 740 may include the test server flagging potential errors for further review by the tester.

At step 745, the test server performs pixel-based comparison by comparing the screen shots of the recorded test case to the screen shots of the playback. The pixel-based comparison may be performed in a conventional manner, e.g., by comparing an entire screen shot obtained during playback to a stored screen shot recorded with the test case. Additionally or alternatively, the pixel-based comparison may be performed based on user-selected sub-areas of a screen shot, e.g., as described in greater detail with respect to FIG. 13.

Figure 8:
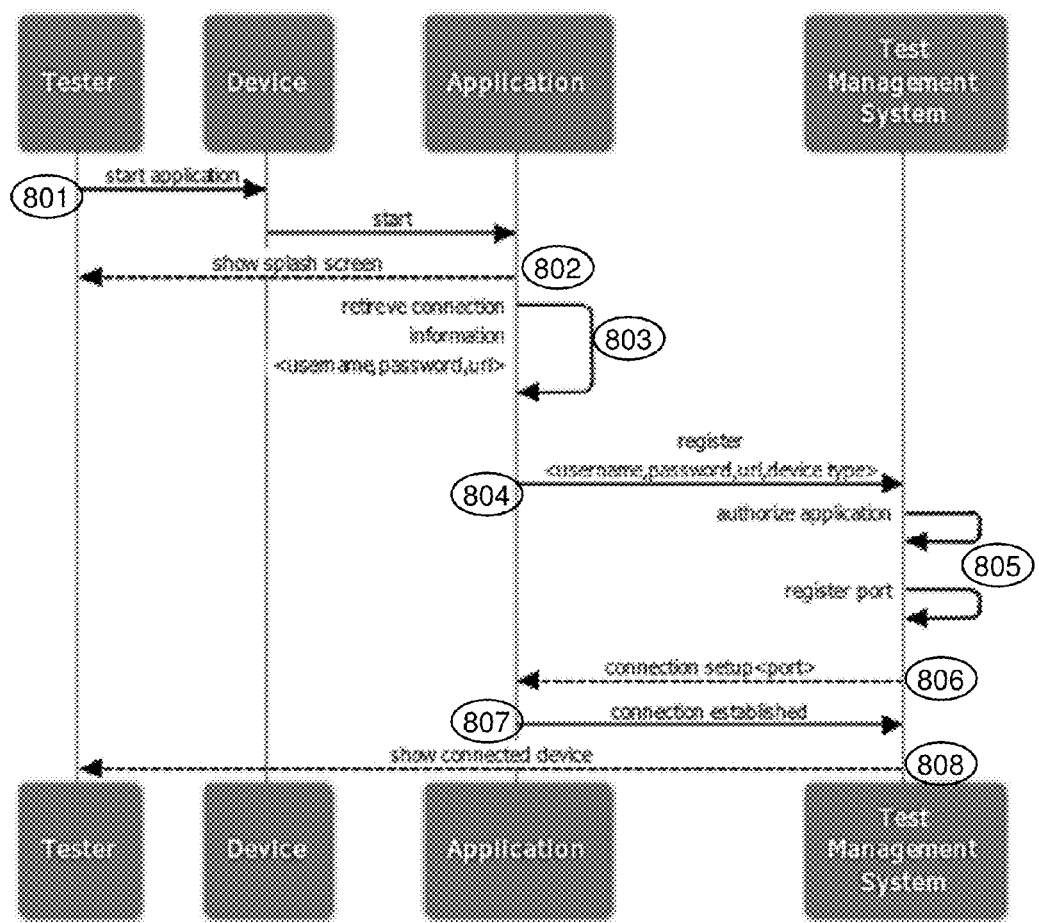

FIG. 8 shows a swim lane diagram of agent registration in accordance with aspects of the invention. In this flow, the actors include: a tester; a device; an application including an agent installed on the device; and a TMS. More specifically, in the example of FIG. 8, an application (e.g., application 70) for testing is loaded on a device (e.g., mobile device 65*a*). The application is instrumented for testing and includes an agent (e.g., agent 75) as described herein. At step 801, the tester opens (e.g., invokes) the application at the device. At step 802, the agent presents a splash screen on the device that informs the tester the device is instrumented for testing (e.g., the application is in test mode). At step 803, the agent retrieves the server connection information (e.g., server name 130 from FIG. 4) for contacting the Test Management System (TMS) (e.g., server 12 running test control 50). The agent then uses the URL of the server to communicate to the TMS to establish a connection, e.g., HTTP connection. At step 804, the agent transmits data defining the type of device it is running on (e.g., hardware platform, operating system, etc.), a username, password and the name of the agent itself to the TMS for registration; although other information can also be provided. At step 805, the TMS authorizes the device, e.g., by authenticating the username and password sent from the agent. At step 806, the TMS sends the connection information back to the agent. At step 807, the agent establishes (assigns) a connection on a new port. At step 808, the TMS shows that the device is connected (e.g., via list 225 of UI 200). It should be understood that when the device is registered, the type of device is also recorded. The agent and TMS may communicate via any suitable communication, such as wireless communication between mobile device and test server.

Figure 9A:
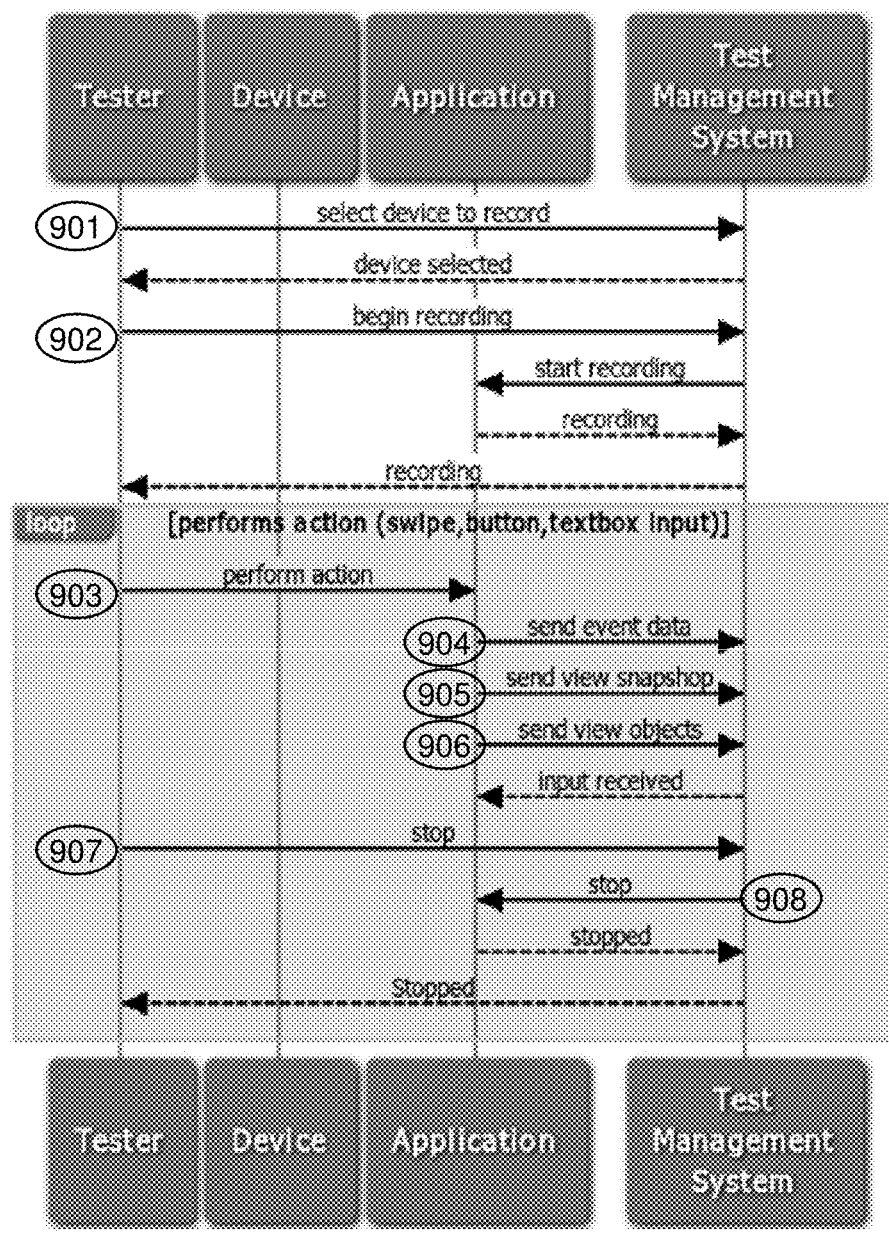

FIG. 9A shows a first swim lane diagram of recording a visual test case in accordance with aspects of the invention. In this flow, the actors include: a tester (e.g., a user interfacing with the mobile device and/or a test workbench), a device which includes agent (which contains an agent library that communicates with TMS), and the TMS (which includes an IDE). In embodiments, preconditions of the processes of FIG. 9A include, e.g., the agent has been instrumented with the agent library and the device is registered and connected to the TMS.

In embodiments of FIG. 9A, when a tester wants to record a test case, the tester can select the device they want to record it on from a testing workbench. After selecting the connected device, the tester can select a record button on the testing workbench. The agent sends the properties of each native object displayed on the view. When a user performs an event, such as a button tap, the agent sends the information about what event was performed and the object it was performed against to the TMS. When a new view is displayed, as the result of an event, the objects within the view are sent to the TMS. The TMS records all the objects for each view for later editing. The agent also sends a screenshot of the view to the TMS. When the tester completes the recording process, a stop button is selected on the testing workbench. The TMS can then send a stop request to the agent which stops sending recording data to the Test Management Server. In this way, the test recorded to the workbench is provided in a step by step format, with the test recorded in, for example, javascript format allowing the user to manipulate the actual scripting. Also, advantageously, the object data from each page as well as each action performed is sent to the TMS. Thus, all inputs recorded are sent to the TMS.

More specifically, at step 901, the tester selects a device with which to work (e.g., via list 225 of UI 200). At step 902, the tester selects (e.g., presses) the record button (e.g., button 210 of UI 200) and the TMS begins recording the test case. During recording, the agent sends to the TMS the data associated with execution of the application (e.g., methods called, method inputs, method returns, screen shots and/or object data as described herein, etc.). For example, when a user performs an action at step 903, such as a button tap, swipe, textbox input, etc., then, at step 904, the agent sends to the TMS information about what application event was performed and the application object it was performed against. At step 905, the agent sends to the TMS a screenshot of each application view when the view changes. This gives the tester a reference point to see when an event or input was received and what effect it had on the view. At step 906, the agent sends to the TMS object data for each object within the view. The TMS records all the object data and for each view for later editing. At step 907, the tester presses the stop button (e.g., button 210 of UI 200) and the TMS stops recording the test case. At step 908, the TMS sends a stop request to the agent telling the agent to stop sending data to the TMS.

Figure 9B:
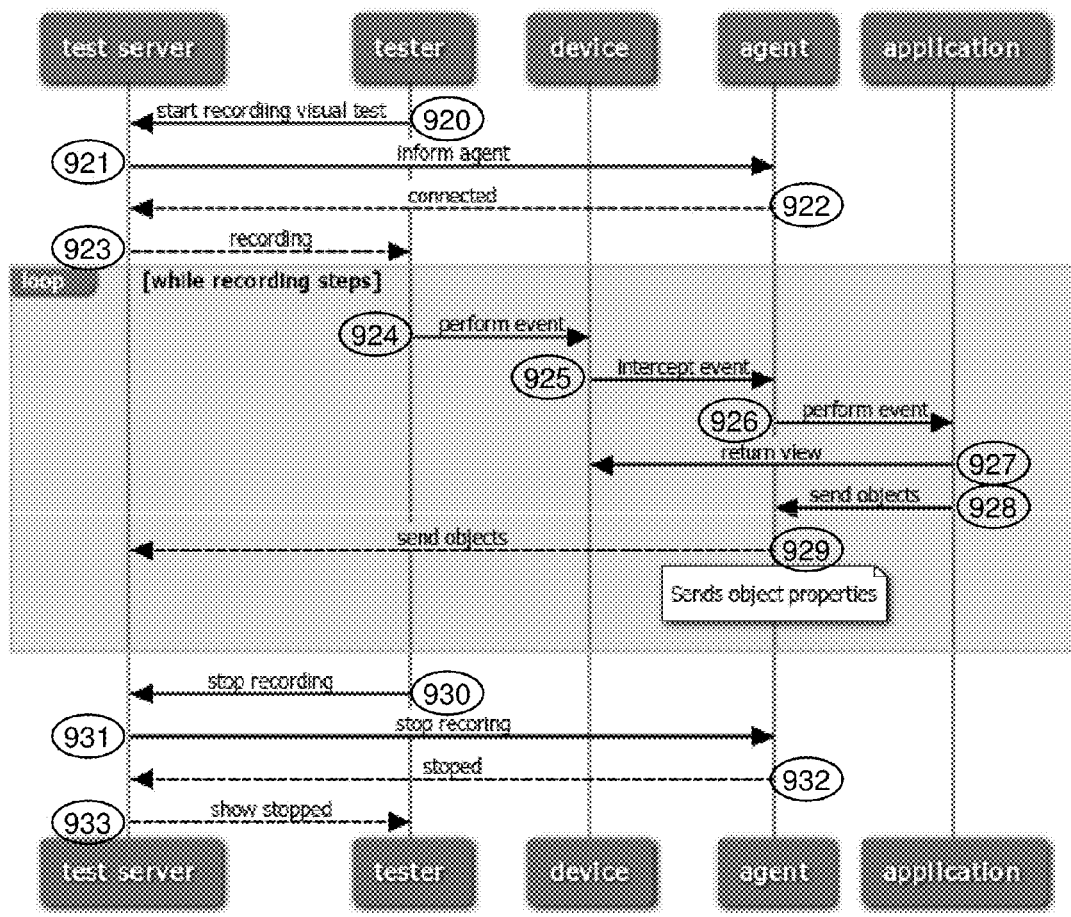

FIG. 9B shows a second swim lane diagram of recording a visual test case in accordance with aspects of the invention. In this flow, the actors include: a tester; a device; an application including an agent installed on the device; and a TMS (e.g., test server). More specifically, at step 920, the tester starts recording the visual test case, e.g., using a user interface of a test server (e.g. UI 200 of test server 12 running test control 50). Step 920 may include the tester selecting a device from a list presented in the user interface (e.g., list 225). At step 921, the test server informs the agent at the device that a test case is being recorded. At step 922, the agent confirms connection to the test server. At step 923, the test server indicates to the tester that the test case is recording, e.g., via message at the user interface. At step 924, the tester performs an event at the device running the application, e.g., a finger tap, swipe, input, etc. At step 925, the agent intercepts the event of step 924 and extracts information about the event for sending to the test server. At step 926, the agent passes the event to the application which processes the event. At step 927, the application returns a view at the device based on the event of step 924. At step 928, the application passes object data of the view to the agent, and at step 929 the agent sends the object data to the test server. Object data of steps 928 and 929 may include, but is not limited to object location, object size, and object coded attributes (e.g., repeating, non-repeating, etc.). Steps 928 and 929 may also include the agent sending a screen shot of the view to the test server. Steps 924-929 are repeated for each event during recording of the visual test case.

At step 930, the tester uses the UI of the test server to stop recording the test (e.g., button 215 or the like). At step 931, the test server instructs the agent to stop recording. At step 932, the agent confirms to the test server that recording is stopped. At step 933, the test server informs the tester that testing is stopped (e.g., via UI 200). In this manner, the process depicted in FIG. 9B may be used to record a visual test case in accordance with aspects of the invention.

Figure 10:
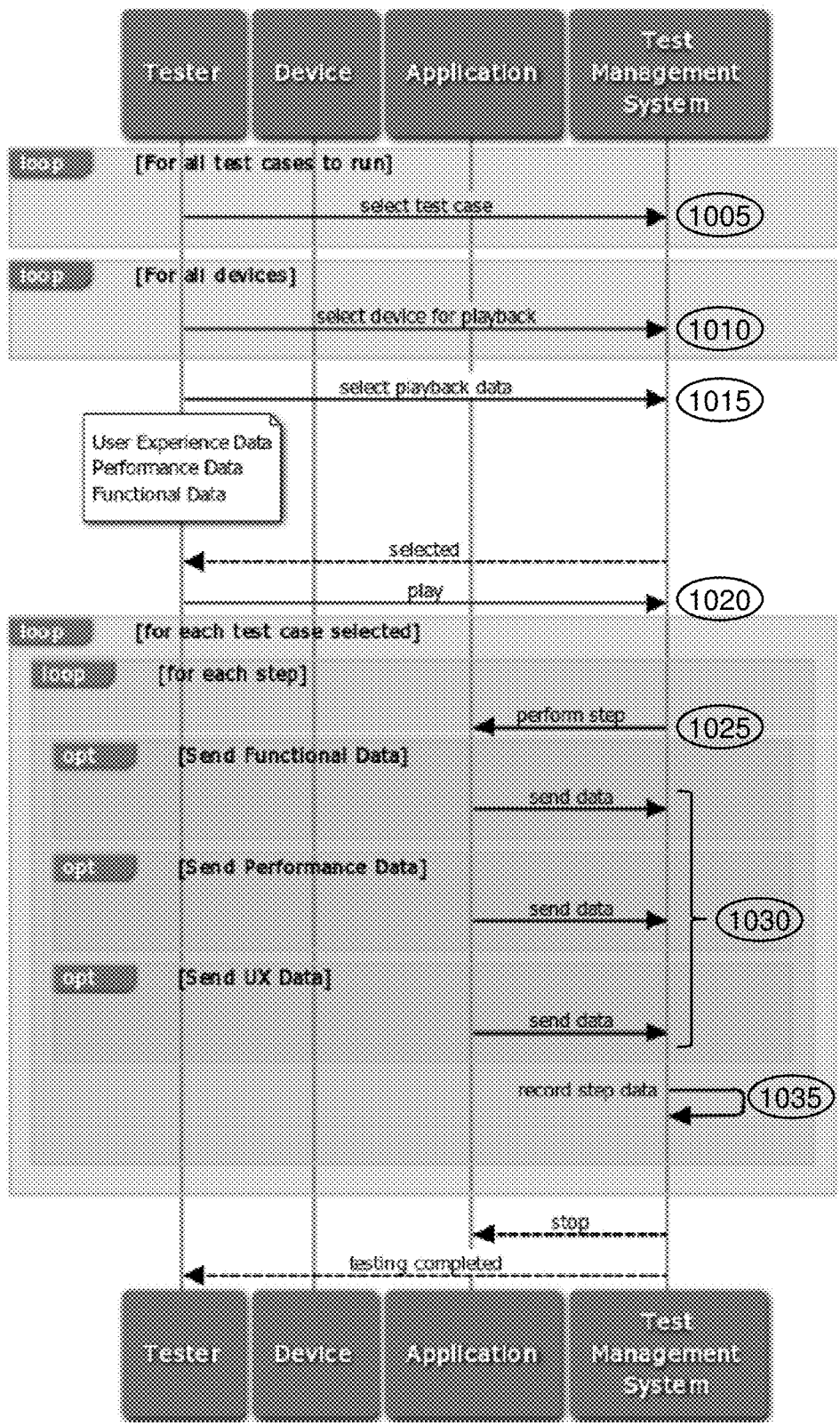

FIG. 10 shows a swim lane diagram of playing back a recorded test case in accordance with aspects of the invention. During testing described herein, a tester plays back a recorded test case on a device and compares the results to the expectations of the test case. Once the tester chooses a test case to run and the device to run the test on, the TMS runs the selected test case on the device. The TMS sends each step of the test case to the device. In embodiments, the tester also selects the type of data they want returned from the agent, i.e., performance data, functional data, or UX data. Selecting the type of data minimizes impact on the agent for the various tests. In aspects of the invention, the agent transmits information back to the TMS without performing any comparisons of data, etc. The steps of the test case are pre-recorded, the TMS sends each step to the agent, the agent causes the application to perform each step, and the agent sends a response back to the TMS after each step.

In the flow of FIG. 10, the actors include: the tester; the TMS; and the agent instrumented in the application and communicating with the TMS. In this flow, preconditions are: the tester has recorded a test case on the TMS; and the application is instrumented with the agent. In this flow, the post conditions are: the test case is played back on the device; the agent sends performance data to the TMS server for each step of the test case; the agent sends introspection data (functions called and variables being instrumented) to the TMS; and the agent sends layout data back to the TMS.

More specifically, at step 1005, the tester selects the test case they want to run on the device. Step 1005 may include, for example, loading a stored test case from a test repository (e.g., storage system 22B) into the test workbench (e.g., UI 200). At step 1010, the tester selects a device for play back (e.g., via list 225 of UI 200). At step 1015, the tester selects a type of play back data to obtain from the device, e.g., UX data, performance data, or functional data. The selection at step 1015 may be made using an interface (e.g., UI 200) of the test server. At step 1020, the tester initiates play back of the test case on the application at the device, e.g., by pressing a play button of an interface (e.g., button 205 of UI 200). At step 1025, the TMS sends instructions to the agent to perform a step of the test case, which causes the agent to cause the application to perform the step of the test case. At step 1030, the agent reports data (e.g., object data as described herein) about the performed step of the test case to the TMS. At step 1035, the TMS records the data received from the agent, e.g., in the test repository. Steps 1025, 1030, and 1035 repeat for all steps of the test case, or until the tester stops the play back.

Figure 11:
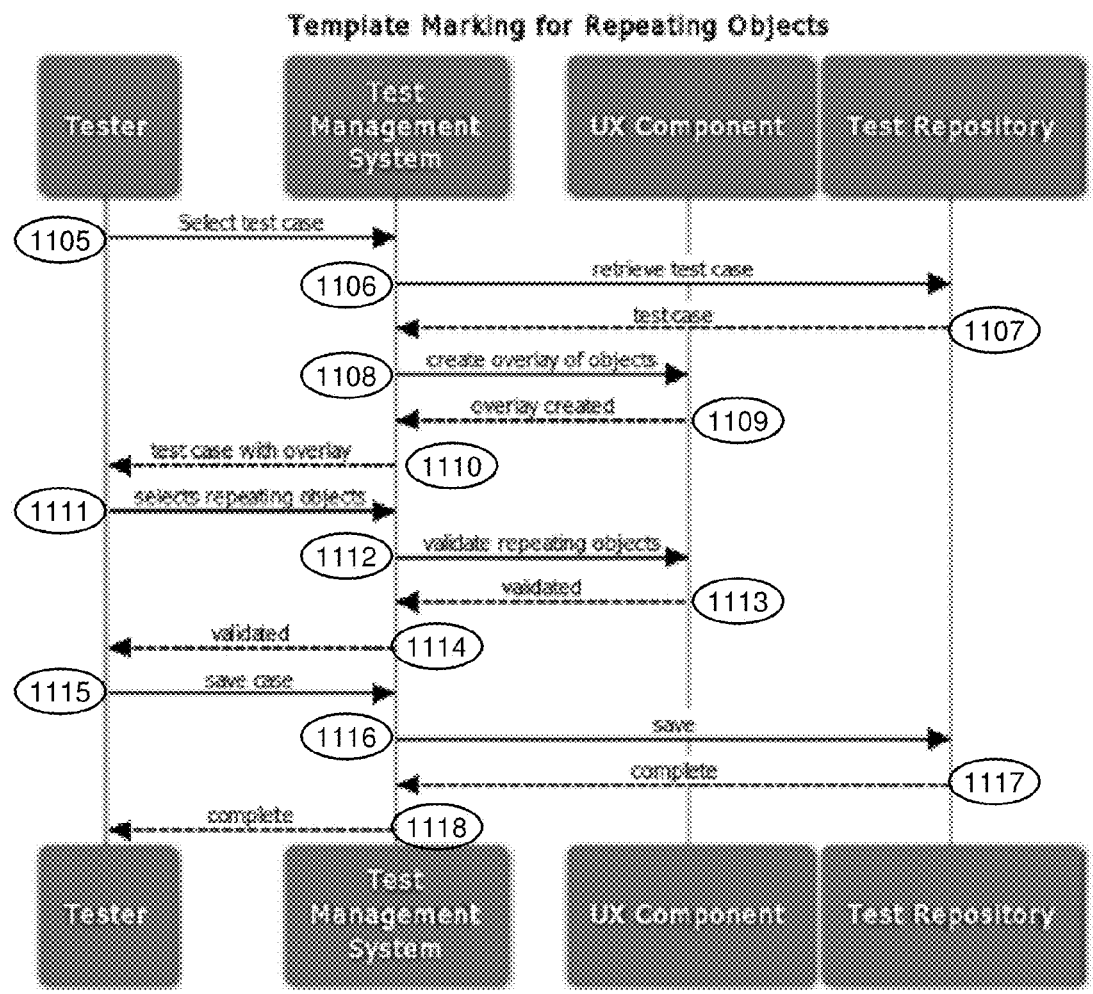

FIG. 11 shows a swim lane diagram of marking objects in a recorded test case in accordance with aspects of the invention. During testing described herein, a tester may wish to mark an area as repeating. This involves looking at the properties of the entire area that repeats and understanding the format of the repeating area. In embodiments, the tester will select an area from the objects of the view and mark them as repeating. This may be performed with a layout editor (e.g., UI 300) in which the layout (e.g., layout 305) overlays or is shown adjacent to the screenshot (e.g., screen shot 310). In aspects of the invention, the tester selects the repeating objects in the layout editor and marks them as repeating. When the tester presses save, the TMS looks at the structure and layout of the requested area and marks the pattern for recognition during playback. This pattern is used on each view during object validation where the UX component validates objects on the view.

In the flow of FIG. 11, the actors include: the tester; a UX component (e.g., test control 50) that validates layouts, properties such as word wrap, height, password field, etc.; the TMS; and the test repository that stores saved test cases. In this flow, preconditions are: a test case has been recorded and the UX objects are recorded. In this flow, the post conditions are: objects within the view are marked as repeating allowing the UX component to validate repeating objects during test replay. Variations to this flow may include: single objects can be marked for UX validation as individual objects.

More specifically, at step 1105, the tester selects a test case for marking using a user interface (e.g., UI 200 or UI 300) of the test server (e.g., TMS). At step 1106, the test server retrieves the test case selected at step 1105 from the test repository. At step 1107, the test case is returned from the test repository to the test server. At step 1108, the test server instructs the UX component to create an overlay of objects. At step 1109, the UX component creates the overlay (e.g., screen shot 310 and layout 305) and provides the overlay to the test server. At step 1110, the test server displays the overlay to the tester via layout editor (e.g., UI 300). At step 1111, the tester uses the layout editor to select and mark one or more objects of the layout as repeating objects (e.g., as described above with respect to FIGS. 6A and 6B). At step 1112, the test server requests the UX component to validate the selected repeating objects. At step 1113, the UX component informs the test server that the selected repeating objects are validated. At step 1114, the test server informs the tester that the selected repeating objects are validated. At step 1115, the tester saves the test case via the layout editor. At step 1116, the test server saves the test case to the test repository. At step 1117, the test repository informs the test server that the save of the test case is complete. At step 1118, the test server informs the tester that the save of the test case is complete.

Figure 12:
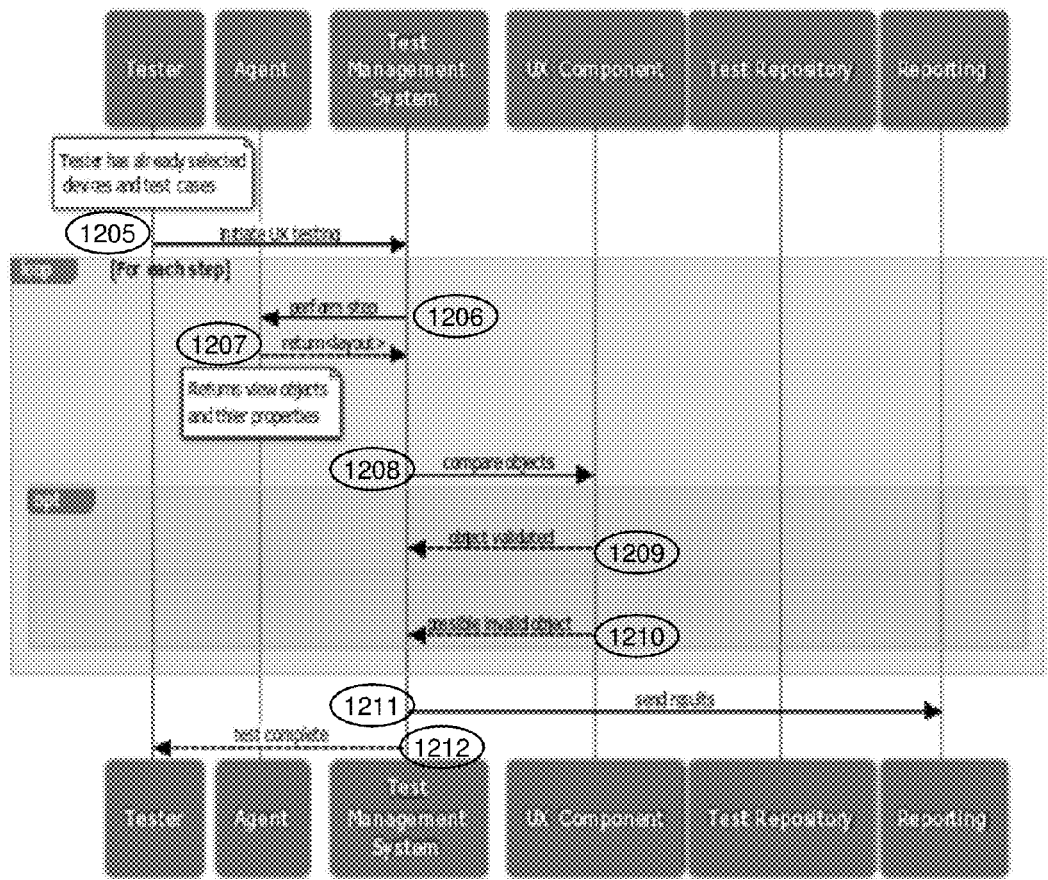

FIG. 12 shows a swim lane diagram of object validation in accordance with aspects of the invention. During testing described herein, when a tester selects UX testing in the playback option in the TMS, the agent returns the object data of all the objects of each step of the test case. In embodiments, the UX component of the TMS compares the location and/or size of the object to be validated with a corresponding stored location and/or size that was recorded. If an object fails validation, it is marked by the UX component as a possible failure. In aspects of the invention, when reviewing a possible failure, the tester can mark the object as accepted (e.g., indicate it is not a failure) and the tolerances are recorded for the device. If there is a dynamic object (such as a repeating section), the area is marked as repeating and the UX component looks at each repeating section for adherence to the section template, which defines how a section of UI can repeat and what are the formatting parameters of a repeating section (e.g., as described with respect to FIGS. 6A and 6B).

In the flow of FIG. 12, the actors include: the agent (e.g., sends visual objects as part of the playback sequence); the TMS (e.g., controls the user interface and connectivity to the test repository); and the UX component (e.g., test control 50 that functions as the validator). In this flow, preconditions are: repeating objects are previously marked for sectional validation; and the tester has selected the tests for playback. In this flow, post conditions are: each repeating section is validated; and individual objects are validated. In a variation of this flow, a section may fail validation and get marked as a possible error. In the event the section is marked as an error but the tester accepts it anyway, then the possible error is stored as a tolerance.

More specifically, at step 1205, the tester initiates UX testing, e.g., by initiating playback of a stored test case on a device having the application and the agent. In embodiments, the tester selects a stored test case for playback, selects a device (e.g., from list 225), and provides a particular input (e.g., presses play button 205 or the like) via a user interface of the test server. At step 1206, the test server instructs the agent to perform the next step of the recorded test case. At step 1207, the agent passes the step the application, the application performs the step, and the agent returns the object data associated with the view to the test server. At step 1208, the test server compares the object data of step 1207 to the stored layout and object data of the stored test case of step 1205. In embodiments, step 1208 may include, but is not limited to comparing object sizes and locations in repeating areas and/or analyzing non-repeating objects that follow repeating areas (e.g., as described above with respect to FIGS. 6A and 6B). In the event the objects are determined as valid, then at step 1209 the UX component returns a message indicating the objects are valid. In the event the objects are determined as a possible error, then at step 1210 the UX component returns a message indicating a possibly invalid object. At step 1211, the test server sends the results of the validation to the reporting component. At step 1212, the test server informs the tester that the test is complete.

Figure 13:
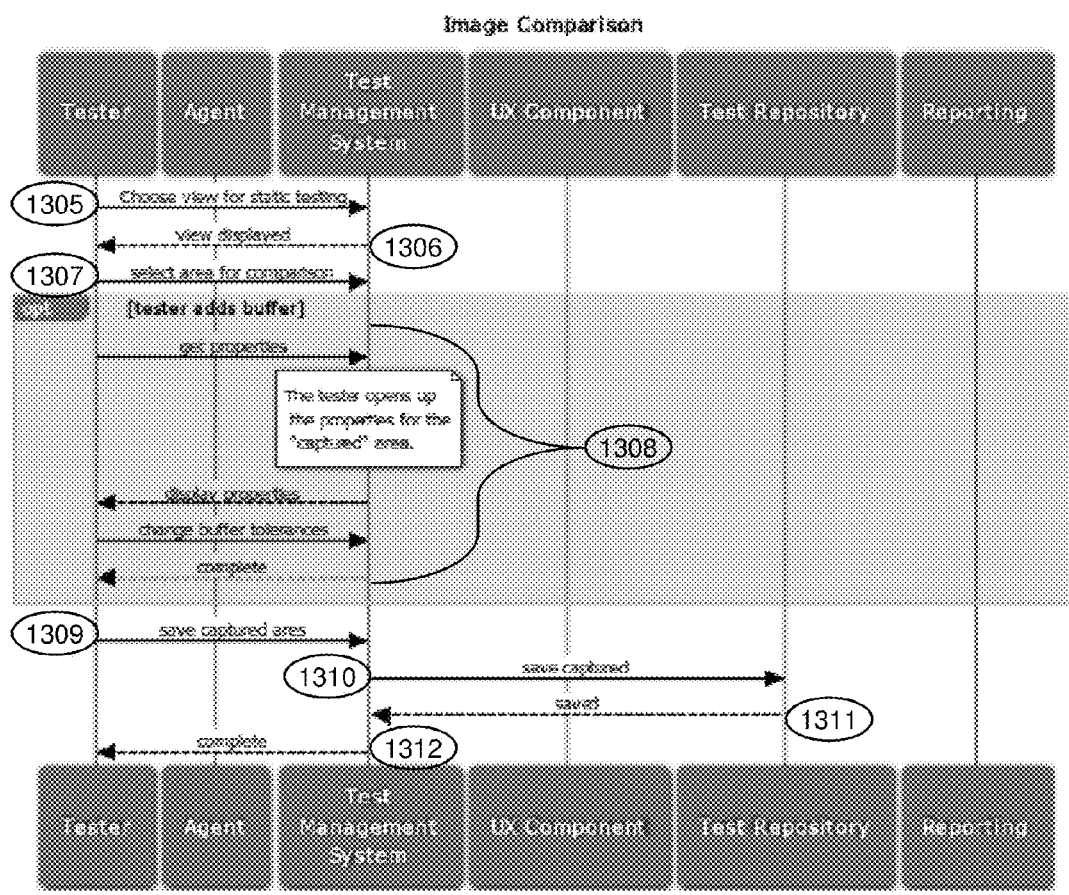

FIG. 13 shows a swim lane diagram of pixel-based comparison in accordance with aspects of the invention. Although layout-based UX testing as described herein has certain advantages over pixel-based testing, pixel comparison is still a useful aspect of UX testing. This is because there are instances when an image or a static area should be tested, and pixel comparison provides a mechanism for this. In aspects of the invention, the tester records the scenarios and creates an object comparison for a specific device (e.g., a specific platform running the application). In embodiments, the tester chooses the view they want to perform image comparison on, and then highlights the areas that they want to compare during the test process. In implementations, when the area is highlighted, an image is taken of the area for comparison and the tester then chooses a buffer from the properties of the selected area. The buffer gives a relative area to look for the image in case there as small changes to the UI, while the compared area remains in the relative same area from test to test. Once the properties are set, the test case area is saved in the test repository.

In the flow of FIG. 13, the actors include: the tester, the test repository, and the TMS. In this flow, preconditions are: the test case has been recorded with screen shots of each step, and the tester is logged into the TMS. In this flow, post conditions are: Area to be compared as part of a UX test case is saved in the test repository. In a variation of this flow, multiple areas of a view can be saved as part of a test case.

More specifically, at step 1305, the tester chooses a view for which they want to perform static testing (e.g., pixel-based comparison). Step 1305 may be performed via a user interface (e.g., UI 200 or UI 300) of the test server. At step 1306, the test server displays the selected view to the tester, e.g., via the user interface. In embodiments, the view displayed at step 1306 is an editable view that allows the tester to select areas for static comparison. At step 1307, the tester selects an area of the displayed view for static comparison. Step 1308 is an optional step in which the tester may alter the properties of the selected area. In embodiments, the tester may request, view, and change one or more properties (e.g., buffer, etc.) of the selected area. In this manner, implementations of the invention allow the image to move a small amount on the device without affecting the test case. At step 1309, the tester initiates saving the captured area(s). At step 1310, the test server saves the capture area(s) to the test repository. At step 1311, the test repository confirms the capture area(s) are saved. At step 1312, the test server informs the tester the capture area(s) are saved.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method of application testing, comprising:
   recording a test case of an application running on a mobile device on a test workbench;
   generating an expected layout based on object data of at least one dynamically repeating object received from the mobile device during the recording, wherein the object data of the at least one dynamically repeating object comprises at least one of properties and programmer defined attributes of the at least one dynamically repeating object being played on the mobile device during recording of the test case;
   receiving playback object data of the at least one dynamically repeating object based on the test case being played back on the mobile device or a different mobile device; and
   comparing the playback object data to the expected layout data,
   wherein at least one of the recording, the generating, the receiving, and the comparing are performed by a computing device.

2. The method of claim 1, wherein the recording comprises:
   establishing communication with an agent residing at the mobile device; and
   receiving the object data from the agent at a test server that is remote from the agent.

3. The method of claim 2, further comprising initiating playback of the test case on the mobile device or the different mobile device by transmitting instructions from the test server to the agent on the mobile device or an agent on the different mobile device.

4. The method of claim 2, wherein the properties of the at least one dynamically repeating object being played on the mobile device during the recording of the test case includes object location and/or object size for at least one dynamically repeating object associated with a view of the application.

5. A method of application testing, comprising:
   recording a test case of an application running on a mobile device;
   generating an expected layout based on object data received from the mobile device during the recording;
   receiving playback object data based on the test case being played back on the mobile device or a different mobile device; and
   comparing the playback object data to the expected layout data,
   wherein at least one of the recording, the generating, the receiving, and the comparing are performed by a computing device,
   wherein the at least one object includes an object that is outside a visible area of a screen of the mobile device, and further comprising displaying the expected layout including the object that is outside the visible area of the screen of the mobile device.

6. The method of claim 1, further comprising receiving a screen shot from the mobile device.

7. The method of claim 6, further comprising displaying the expected layout and the screen shot simultaneously in a layout editor.

8. The method of claim 6, further comprising:
   receiving a playback screen shot based on the test case being played back on the mobile device or the different mobile device; and
   comparing the playback screen shot to the screen shot.

9. The method of claim 1, wherein:
   the receiving the playback object data comprises receiving the playback object data from the different mobile device; and
   the different mobile device has a different platform and/or operating system than the mobile device.

10. The method of claim 1, further comprising automatically determining repeating areas based on coded object attributes included in the object data.

11. The method of claim 1, further comprising automatically determining repeating areas based on pattern recognition using the object data.

12. The method of claim 1, further comprising providing a user with an interface to manually mark objects as repeating or non-repeating.

13. A system for testing applications, comprising:
   a test server comprising a test control adapted to:
      generate an expected layout based on object data of at least one dynamically repeating object received while recording a test case of an application, wherein the object data of the at least one dynamically repeating object comprises properties of the at least one dynamically repeating object being played on a mobile device during recording of the test case;
      receive playback object data of the at least one dynamically repeating object during playback of the test case on a mobile device equipped with the application; and
      compare the playback object data to the expected layout.

14. The system of claim 13, wherein the properties of the at least one dynamically repeating object being played on the mobile device during the recording of the test case includes object location and/or object size for the at least one dynamically repeating object associated with a view of the application.

15. A system for testing applications, comprising:
a test server comprising a test control adapted to:
generate an expected layout based on object data of at least one object received while recording a test case of an application, wherein the object data of the at least one object comprises properties of the at least one object being played on a mobile device during recording of the test case;
receive playback object data during playback of the test case on a mobile device equipped with the application; and
compare the playback object data to the expected layout,
wherein the properties of the at least one object being played on the mobile device during the recording of the test case includes object location and/or object size for the at least one object associated with a view of the application,
the at least one object includes a scrollable object that is outside a visible area of a display screen, and
the test server is adapted to display the expected layout including the scrollable object that is outside the visible area of the display screen.

16. The system of claim 13, wherein the test server is adapted to:
receive a screen shot associated with the object data; and
display the expected layout and the screen shot simultaneously in a layout editor.

17. The system of claim 13, wherein the test server is adapted to at least one of:
automatically determine repeating areas based on coded object attributes included in the object data;
automatically determine repeating areas based on pattern recognition using the object data; and
provide a user with an interface to manually mark objects as repeating or non-repeating.

18. The system of claim 13, wherein the test server remotely controls the playback of the test case by transmitting control signals to an agent loaded with the application on the mobile device.

19. The system of claim 18, wherein the test server receives the playback object data from the agent.

20. A computer system for testing an application, the system comprising:
a CPU, a computer readable memory, and a computer readable storage media;
program instructions to communicate with an agent loaded on a mobile device to remotely control running a test case of the application on the mobile device;
program instructions to receive, from the agent loaded on the mobile device, a screen shot and playback object data associated with a view of the application during the test case, wherein the playback object data includes objects both inside and outside a visible area which is otherwise accessible by a scrolling action on the mobile device and at least one of object location and object size;
program instructions to use the screen shot and playback object data received from the agent to create and display a layout corresponding to a layout on a test device which includes the objects both inside and outside a visible area; and
program instructions to compare the playback object data to an expected layout, and to compare the objects both inside and outside a visible area of the screen shot and which is otherwise accessible by the scrolling action to an expected screen shot,
wherein the program instructions are stored on the computer readable storage media for execution by the CPU via the computer readable memory; and
the receiving and the comparing are performed at a test server that is separate from the mobile device.

* * * * *